United States Patent Office 3,428,629
Patented Feb. 18, 1969

3,428,629
HALOVINYL COMPOUNDS
Emil B. Rauch, Port Dickinson, and John A. Welsh, Binghamton, N.Y., assignors to GAF Corporation, New York, N.Y., a corporation of Delaware
No Drawing. Filed July 13, 1965, Ser. No. 471,762
U.S. Cl. 260—240
Int. Cl. C07d 85/46; C09b 23/06; G03c 1/52
9 Claims

ABSTRACT OF THE DISCLOSURE 2-(beta-chloro- or beta-bromo-beta-alkyl- or beta-arylvinyl)-ortho-aryleneoxazoles of which the ortho-arylene group is phenylene, naphthylene, mono- or dialkylphenylene, chlorophenylene, phenylphenylene or 2'-thienyl-phenylene and the beta-alkyl or beta-aryl radical attached to the vinyl group is chloro-methyl, alkyl of 1–17 carbon atoms, phenyl, chloro-phenyl, tolyl or naphthyl.

---

This invention relates to 2-(β-halo)-vinyloxazoles and their preparation. More particularly this invention relates to 2-(β-halo)-vinylbenzoxazoles.

In our copending applications, Ser. Nos. 426,425 and 426,387 filed on Jan. 18, 1965, now U.S. Patent Nos. 3,316,274 and 3,375,258, respectively, we have disclosed the preparation of ketones of the structure

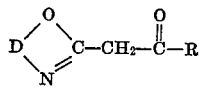

wherein D is a divalent ortho arylene group and R is an alkyl or aryl group. For convenience these compounds are referred to herein as 2-(ω-acyl)-methyloxazoles. As pointed out in our copending applications, these compounds are intermediates for the preparation of merocyanine dyes which are useful as photographic sensitizers. It was initially considered that these compounds might be used to prepare other dye intermediates, particularly 2-(β-halo)-vinyloxazoles of the structure

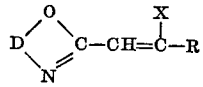

wherein X is halogen with D and R having the same significance as above. Unfortunately we have found that the typical well known halogenating agents, such as $PCl_3$, $PCl_5$, or $POCl_3$, when used alone, failed to yield the desired compounds. In fact treatment with $PCl_3$ or $PCl_5$ results in the decomposition of the starting 2-(ω-acyl)-methyloxazoles.

The principal object of this invention is to provide 2-(β-halo)-vinyloxazoles. A further object of this invention is to provide a process of converting 2-(ω-acyl)-methyloxazoles into 2-(β-halo)-vinyloxazoles.

We have now found that 2-(ω-acyl)-methyloxazoles can be converted into 2-(β-halo)-vinyloxazoles by reacting the former compound with a phosphorus halide in a phosphorus oxyhalide medium. This is completely unexpected since, as pointed out above, the phosphorus halides and oxyhalides individually are incapable of converting 2-(ω-acyl)-methyloxazoles into the desired 2-(β-halo)-vinyloxazoles.

As indicated above, the 2-(ω-acyl)-methyloxazoles utilizable in our invention have the structure

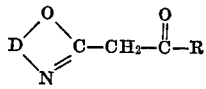

wherein D is a divalent ortho arylene group and R is an alkyl group of 1 to 17 carbon atoms or an aryl group. In somewhat greater detail, D can be an o-phenylene group or an o-naphthylene group; R can be methyl, ethyl, propyl, heptadecyl, chloroethyl, phenyl, chlorophenyl (o,m,p) tolyl, xylyl, naphthyl, chloronaphthyl. It is, of course, understood that the "phenylene," "naphthylene," "arylene," "alkyl" and "aryl" groups can contain inert, innocuous substituents, such as halogen (chloro or bromo), hydrocarbon substituents, etc. which do not interfere with the claimed reaction. Groups containing these substituents are deemed to be equivalents of the recited groups.

Suitable 2-acetonyloxazoles (R in the above formula is alkyl) include 2-acetylmethylbenzoxazole, 2-propionylmethylbenzoxazole, 2-stearoylmethylbenzoxazole, 2-acetylmethyl - 5 - phenylbenzoxazole, 2-acetylmethyl-5,6-dimethylbenzoxazole, 2 - acetylmethyl-5-chlorobenzoxazole, 2-acetylmethyl-5-octylbenzoxazole, 2-chloroacetylmethylbenzoxazole, 2 - propionylmethyl - 5-phenylbenzoxazole, 2-propionylmethyl-5,6-dimethylbenzoxazole, 2-propionylmethyl-4-chlorobenzoxazole, 2-acetylmethylnaphth (2.3) oxazole, 2-propionylmethylnaphth (2.1) oxazole, 2-stearoylmethylnaphth (1.2) oxazole, etc. Suitable 2-phenacyloxazoles (R in the above formula is aryl) include 2-benzoylmethylbenzoxazole, 2 - benzoylmethyl-5-phenylbenzoxazole, 2 - benzoylmethyl - 5,6 - dimethylbenzoxazole, 2-benzoylmethyl-5-chlorobenzoxazole, 2-benzoylmethyl-5-octylbenzoxazole, 2 - (o,m,p) - toluylmethylbenzoxazole, 2-(o,m,p)-toluylmethyl-5,6-dimethylbenzoxazole, 2-(o,m, p)-chlorobenzoylmethylbenzoxazole, 2-naphthoylmethyl-5,6-dimethylbenzoxazole, 2-benzoylmethylnaphth (2.1) oxazole, 2-toluylmethylnaphth (2.3) oxazole, 2-acetylmethyl-5-(2'-thienyl)-benzoxazole, 2 - propionylmethyl-5-(2'-thienyl)-benzoxazole, etc. The various 2-acetylmethyl, 2-propionylmethyl and 2-benzoylmethyl members of the benzoxazole series are preferred since they give rise to intermediates which have the greatest utility in the formation of photosensitive dyes, such as cyanine dyes.

As indicated above, the conversion of the 2-(ω-acyl)-methyloxazoles to 2-(β-halo)-vinyloxazoles is carried out by reacting said 2-(ω-acyl)-methyloxazoles with a phosphorus halide in a phosphorus oxyhalide reaction medium. Phosphorus pentachloride is the preferred phosphorus halide for use in our invention because of its relatively low cost and effectiveness. Best results have been obtained when both the phosphorus oxyhalide diluent (reaction medium) and the phosphorus halide are based upon the same halogen. In this way it is possible to avoid formation of a mixture of monovinyl halogen compounds and the attendent purification problems. Accordingly, the 2-(β-chloro)-vinyloxazoles are preferably prepared with phosphorus pentachloride and phosphorus oxychloride. Correspondingly the 2-(β-bromo)-vinyloxazoles are preferably prepared with phosphorus pentabromide and phosphorus oxybromide. In reality, the particular halide compound employed is not too important since the ultimate use of the 2-(ω-halo)-vinyloxazoles, the halogen atom is lost. However, it is economically more attractive to use a mixture of phosphorus pentachloride and phosphorus oxychloride. In general phosphorus halide is used in a concentration of about 0.5 to 2 moles per mole of 2-(ω-acyl)-methyloxazole.

The reaction is conveniently carried out at a temperature of about 60 to 150° C., preferably at the reflux temperature of the phosphorus oxyhalide diluent. No advantages have been found in carrying out this reaction in pressure vessels. After the reaction is completed, the phosphorus oxyhalide diluent is distilled under vacuum from the reaction medium.

The 2-(β-halo)-vinyloxazoles can be quaternized and then condensed with active 2-methyl compounds, such as quaternized 2-methylbenzothiazoles or 2-methylbenzoselenazoles in order to form various unsymmetrical meso substituted carbocyanine dyes. These reactions are the subject of our copending applications, Ser. Nos. 471,723 and 471,758, filed on even date of this application.

The following examples are illustrative and should not be construed as limiting the scope of this invention:

EXAMPLE I

This example illustrates the preparation of 2-(β-chloro-β-phenyl)-vinyl-5,6-dimethylbenzoxazole. Five and sixty-six one hundredths grams (0.02 mole) of 5,6-dimethyl-2-benzoylmethylbenzoxazole(5,6 - dimethyl - 2 - phenacylbenzoxazole), 4.16 grams phosphorus pentachloride (0.02 mole) and 40 ml. phosphorus oxychloride were mixed together to yield a clear yellow solution and refluxed for six hours at a temperature of 125–130° C. Phosphorus oxychloride was then distilled under vacuum from the reaction vessel. The resulting stiff yellow oil was extracted several times with ice water, followed by the addition of isopropanol from which a white solid precipitated. The white solid was filtered and washed with isopropanol. Four and five tenths grams of 2-(β-chloro-β-phenyl)-vinyl-5,6-dimethylbenzoxazole (79% of the theoretical yield) having a melting point of 160 to 161° C. was isolated. After one recrystallization from ethanol the product had a melting point of 162 to 163° C.

Analysis.—Calc. for $C_{17}H_{14}ClNO$, percentage: C, 71.95; H, 4.97; Cl, 12.50. Found: C, 71.85, 71.89; H, 5.02, 5.10; Cl, 12.85, 12.82.

The corresponding 2-(β-chloro - β - phenyl)-vinylbenzoxazole is prepared by using an equivalent concentration of 2-benzoylmethylbenzoxazole in place of 5,6-dimethyl-2-benzoylmethylbenzoxazole.

The corresponding 2-(β-chloro-β-methyl)-vinyl-5,6-dimethylbenzoxazole is prepared by using an equivalent concentration of 2-acetylmethyl-5,6-dimethylbenzoxazole in place of 5,6-dimethyl-2-benzoylmethylbenzoxazole.

The corresponding 2-(β-chloro-β-ethyl)-vinyl-5-chlorobenzoxazole is prepared by using an equivalent concentration of 2-propionyl-5-chlorobenzoxazole in place of 5,6-dimethyl-2-benzoylmethylbenzoxazole.

Replacement of the 0.02 mole of phosphorus pentachloride and 40 ml. phosphorus oxychloride with 0.02 mole of phosphorus pentabromide and 40 grams phosphorus oxybromide yields 2-(β-bromo-β-phenyl)-vinyl-5,6-dimethylbenzoxazole.

EXAMPLE II

This example illustrates the preparation of 2-(β-phenyl-β - chloro) - vinyl - 5 - phenylbenzoxazole. Eight grams of 2 - benzoylmethyl - 5 - phenylbenzoxazole - (2 - phenacyl-5-phenylbenzoxazole) and 5.35 grams phosphorus pentachloride were dissolved in 100 ml. phosphorus oxychloride. The clear solution was heated for sixteen hours at reflux temperature of 115 to 120° C. on an oil bath. The phosphorus oxychloride was then distilled under vacuum. The clear yellow reaction product was cooled, dried and extracted with ice water several times. Seventy-five ml. of isopropanol was added yielding a white precipitate. The product after filtration and drying had a melting point of from 115 to 120° C. After one recrystallization from methylcellosolve, 3 grams of 2-(β-phenyl-β-chloro)-vinyl-5-phenylbenzoxazole having a melting point of 121.5 to 122° C. was obtained. The product after a second recrystallization from benzene had a melting point of 124 to 125° C.

Analysis.—Calc. for $C_{21}H_{14}ClNO$, percentage: Cl, 10.75; N, 4.45. Found: Cl, 11.07, 10.92; N, 4.18, 4.11.

A by-product of the reaction having a melting point of 108 to 108.5° C. was also obtained after recrystallization from isopropanol. This material has the structure 2-(2-phenyl-2,2-dichloro)-ethyl-5-phenylbenzoxazole.

Analysis.—Calc. for $C_{21}H_{15}NOCl_2$, percentage: Cl, 19.26; N, 3.98. Found: Cl, 19.38, 19.39; N, 3.68, 3.79.

EXAMPLE III

Example II was repeated using 8 grams of 2-benzoylmethyl-5-phenylbenzoxazole, 5.32 grams phosphorus pentachloride in 90 ml. of phosphorus oxychloride. The solution was refluxed for six hours in a metal bath heated at 125° C. Eight and four-tenths grams (99% of the theoretical yield) of 2-(β-phenyl-β-chloro)-vinyl-5-phenylbenzoxazole having a melting point of 130° C. was obtained.

Analysis.—Calc. for $C_{21}H_{14}ClNO$, percentage: C, 76.01; H, 4.25; N, 4.22; Cl, 10.69. Found: C, 76.01, 76.07; H, 4.49, 4.46; N, 4.43, 4.17; Cl, 10.69, 10.46.

Variations and modifications can be made in the procedures, compositions and materials described without departing from the scope or spirit of this invention.

We claim:
1. A 2-(beta-halo)-vinyloxazole having the structure:

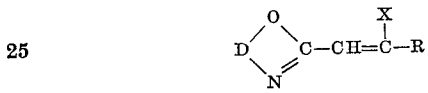

wherein D is an ortho divalene arylene selected from the class consisting of phenylene, naphthalene, mono or dialkyl phenylene of which the alkyl groups contain 1–8 carbon atoms, chlorophenylene, phenylphenylene and 2-thienyl-phenylene—the chloro substituent of the phenylene group can be one of the positions 4 and 5 of the resultant benzoxazole nucleus, the remaining substituents of the mono-substituted phenylene groups can be the 5-position of the resultant benzoxazole nucleus, and the alkyl groups of the dialkylene-phenylene group can be the 5–6-positions of the resultant benzoxazole nucleus; X is a halogen selected from the group consisting of chlorene and bromine, and R is a radical selected from the group consisting of chloromethyl, alkyl of 1–17 carbon atoms, phenyl, chlorophenyl, tolyl and naphthyl.

2. The compound of claim 1, wherein R is phenyl.
3. The compound of claim 1, wherein R is an alkyl group of 1–17 carbon atoms.
4. The compound of claim 1, wherein R is methyl.
5. The compound of claim 1, wherein R is ethyl.
6. The compound of claim 1, wherein X is chloro.
7. 2-(beta-chloro-beta-phenyl-vinyl)-5,6-dimethyl benzoxazole.
8. 2-(beta-chloro-beta-phenyl-vinyl) - 5 - phenylbenzoxazole.
9. A compound having the following formula:

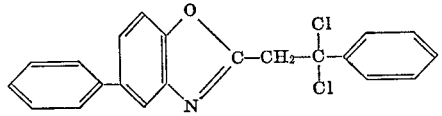

References Cited
UNITED STATES PATENTS 2,243,081 5/1941 Brooker et al. ----- 260—240.6
2,369,657 2/1945 Brooker et al. --- 260—240 XR HENRY R. JILES, Primary Examiner.

JOHN M. FORD, Assistant Examiner.

U.S. Cl. X.R.

260—307; 96—90